United States Patent [19]
Gay et al.

[11] Patent Number: 5,348,689
[45] Date of Patent: Sep. 20, 1994

[54] MOLTEN SALT DESTRUCTION OF ALKALI AND ALKALINE EARTH METALS

[75] Inventors: Ricahard L. Gay, Chatsworth; Jerold Guon, Woodland Hills; John C. Newcomb, Simi Valley, all of Calif.

[73] Assignee: Rockwell International Corporation, Seal Beach, Calif.

[21] Appl. No.: 90,458

[22] Filed: Jul. 13, 1993

[51] Int. Cl.$^5$ ............................................. G21F 9/00
[52] U.S. Cl. ........................ 588/18; 588/201; 423/163; 423/165; 423/186; 423/189; 423/190; 423/197; 423/2
[58] Field of Search ............... 423/5, 158, 190, 163, 423/165, 184, 186, 189, 210.5; 252/626, 631; 588/261, 201

[56] References Cited
U.S. PATENT DOCUMENTS

| | | | |
|---|---|---|---|
| 3,984,345 | 10/1976 | Heylen et al. | 252/633 |
| 4,032,615 | 6/1977 | Johnson | 423/179 |
| 4,145,396 | 3/1979 | Grantham | 423/22 |
| 4,154,607 | 5/1979 | Wikman et al. | 75/432 |
| 4,254,089 | 3/1981 | Levy | 423/179 |
| 4,477,373 | 10/1984 | Grantham et al. | 252/626 |
| 4,643,846 | 2/1987 | Kanai et al. | 252/626 |
| 4,800,003 | 1/1989 | Peacey et al. | 204/70 |
| 4,895,678 | 1/1990 | Ohtsuka et al. | 252/632 |

*Primary Examiner*—Donald P. Walsh
*Assistant Examiner*—Ngoclan T. Mai
*Attorney, Agent, or Firm*—H. Fredrick Hamann; Harry B. Field; Steven E. Kahm

[57] ABSTRACT

A process for destroying alkali metal and alkaline earth metal-containing wastes, such as sodium, by feeding such waste into a molten bath containing a molten salt such as sodium carbonate, or a mixture of salts having a lower melting point, such as a mixture of sodium carbonate and an alkali metal halide, e.g. sodium chloride, or mixtures of alkali metal chlorides, feeding a mixture of carbon dioxide and oxygen into the molten salt bath and reacting the alkali metal or alkaline earth metal such as sodium in the waste with the carbon dioxide and oxygen to form alkali metal carbonate, e.g. sodium carbonate, in the molten salt bath.

18 Claims, 1 Drawing Sheet

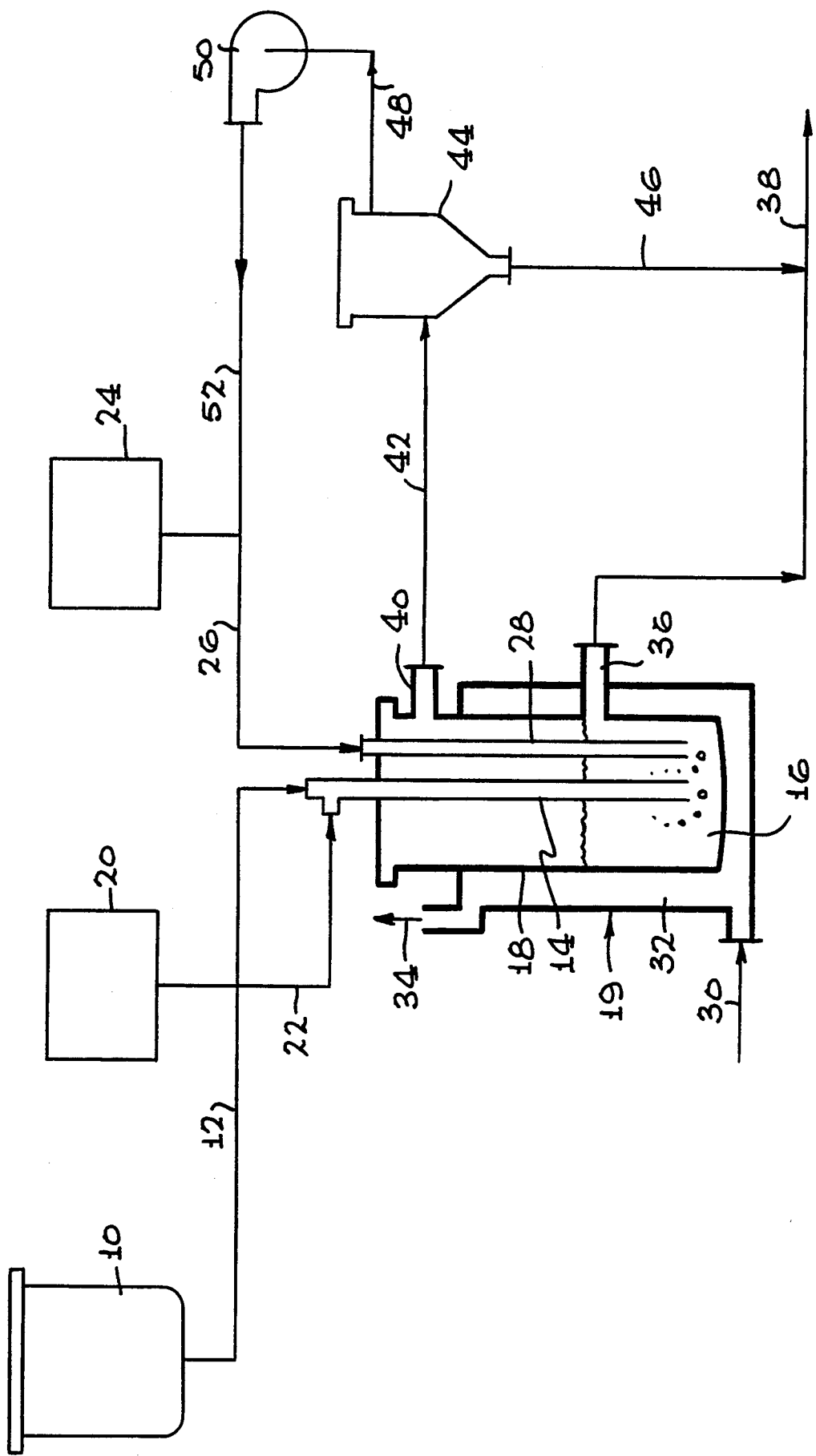

MOLTEN SALT DESTRUCTION OF ALKALI AND ALKALINE EARTH METALS

BACKGROUND OF THE INVENTION

1. Field of the Invention

This invention relates to the destruction of alkali metal and alkaline earth metal waste. It particularly relates to a molten salt process for destroying alkali metals such as sodium, potassium, and lithium, and mixtures thereof, present in liquid metal reactor coolants.

2. Description of the Prior Art

Alkali and alkaline earth metal waste e.g. radioactive sodium waste from reactor heat transfer media, are hazardous wastes because of the characteristic of reactivity. Before they can be disposed of, this characteristic must be destroyed. A large inventory of such metals, particularly sodium, potassium, lithium and mixtures of these metals are also radioactive.

A number of processes for the disposal of these metals such as sodium exists. These include reaction of sodium with water, reaction of sodium with concentrated caustic, reaction with alcohol, burning of sodium in oxygen, calcination with silica, and reactions of sodium with ammonia, hydrogen, halogens and nitrous oxide. However, these present methods for the destruction of the characteristic of reactivity of alkali metals such as sodium have been proven generally unsatisfactory and disadvantageous for various reasons, such as the production of hydrogen, an explosive gas, or oxides, which are highly corrosive. Thus, the provision of a suitable method and the design of facilities to process large quantities of alkali and alkaline earth metal waste, such as sodium, is very challenging.

SUMMARY OF THE INVENTION

According to the present invention, alkali and alkaline earth metals such as sodium, are reacted with a mixture of carbon dioxide and oxygen (or air) in a molten salt bath, e.g. molten alkali carbonate such as sodium carbonate. The alkali carbonate, e.g. sodium carbonate salt, resulting from the oxidation reaction is not hazardous and merely adds to the volume of salt in the bath. If the feed metal such as sodium is radioactive, most of the radioactivity remains in the molten salt bed. When operated as either a batch or continuous process, there are no reactive off-gas products. The reaction rate and operating temperature are readily controllable and there is essentially no release of radioactive materials from the salt bath.

The salt composition of the molten salt bath can be tailored to lower the melting point of the salt. For example, if sodium is converted to sodium carbonate by reaction with oxygen and carbon dioxide, the melting point of the salt will be about 855° C. The reaction can be carried out at much lower temperatures, e.g. within the limits of about 200° C. to about 900° C., provided that the molten salt bed contains salts which result in lower melting mixtures. For example, these salts may include or consist of mixtures of alkali metal halides, e.g. chlorides and alkaline earth halides, e.g. calcium chlorides, and mixtures thereof. The properties of the salt composition may also be tailored by adding sulfate, phosphate or nitrate salts. Some make-up, for example, chloride salt, will be needed to maintain the low melting point. At lower molten salt bath temperatures, the salt vapor pressure and radioactive element carryover will be lower, corrosion will be reduced and metal containment vessels, such as Inconel 600, can be used. As another alternative, if chloride salts are used, chlorine gas or chlorinated hydrocarbons can be sparged through the molten salt bed to convert carbonates to chlorides.

OBJECTS OF THE INVENTION

It is accordingly one object of the present invention to provide an improved method for the destruction of alkali and alkaline earth metal hazardous waste.

Another object is the provision of a relatively simple process for the destruction of such hazardous waste, e.g. sodium, in a molten salt bath to form non-hazardous alkali and alkaline earth metal salts.

A particular object is the provision of a method for destruction of alkali and alkaline earth metals, especially sodium, by reaction with a mixture of carbon dioxide and oxygen in a molten carbonate salt bath.

BRIEF DESCRIPTION OF THE DRAWING

The sole Figure of the drawing shows a schematic illustration of a system for practicing the invention process.

DETAILED DESCRIPTION OF THE PREFERRED EMBODIMENTS

In the broadest aspects of the invention, there is provided a process for destroying alkali metal and alkaline earth metal hazardous waste and converting it into non-hazardous salt which comprises feeding the alkali metal or alkaline earth metal-containing hazardous waste into a molten salt bath containing a molten salt selected from the group consisting of an alkali metal carbonate, such as sodium carbonate, an alkali metal halide, such as sodium chloride, an alkaline earth halide such as calcium chloride, and mixtures thereof, feeding a mixture of carbon dioxide and oxygen into the molten salt bath, the proportions of carbon dioxide and oxygen being at least sufficient to react stoichiometrically with the alkali metal or alkaline earth metal in the waste, and reacting the alkali metal or the alkaline earth metal with the carbon dioxide and oxygen in the molten salt bath at a temperature above the melting point of the salt in the molten salt bath, and converting the alkali metal or the alkaline earth metal into a non-hazardous carbonate salt in the bath. The salts formed in the molten carbonate bath are alkali metal or alkaline earth metal carbonates such as sodium, potassium, lithium or calcium carbonate. Sulfate such as sodium sulfate, phosphate such as sodium phosphate, or nitrate such as sodium nitrate, can be added to the molten salt bath to tailor specific properties of the salt such as melting point, fission product retention, physical form of salt waste, physical form of salt collected on the filter, and the like.

There are two aspects of the invention. The first is the in-situ conversion of the alkali or alkaline earth metal, e.g. sodium metal, to sodium carbonate in the presence of a molten, e.g. sodium carbonate, salt which has a partial pressure of oxygen and a partial pressure of carbon dioxide in the salt bath, as by bubbling or sparging the $CO_2$ and $O_2$ into the molten salt bath. Thus, for the conversion of sodium to sodium carbonate by reaction with oxygen and carbon dioxide in molten sodium carbonate alone, the reaction takes place at a temperature of about 800° C. to about 900° C., more particularly about 855° C., the melting point of sodium carbonate.

The proportions of $CO_2$ and $O_2$ must be sufficient to react stoichiometrically with the alkali metal or alkaline earth metal, to form the alkali metal or alkaline earth metal carbonate, e.g. sodium carbonate. It has been found that if the amount of oxygen is insufficient to react with sodium to form sodium carbonate, then some CO by-product can be formed. If there is an excess amount of oxygen then only $CO_2$ will be formed in the reaction, with no CO present. It is preferred to operate with an excess amount of oxygen and an excess amount of carbon dioxide, e.g. of at least 10%, and ranging from an excess of from about 10% to about 200%, of the stoichiometric amount required for reaction with the alkali metal or alkaline earth metal in the bath. The alkali metal or alkaline earth metal reacts with the $CO_2$ and $O_2$ gases in the molten salt bath so that the gases are being consumed and converted into carbonate salts, with the alkali metal or alkaline earth metal. Theoretically, complete conversion of the alkali metal or alkaline earth metal to carbonates can occur with no offgases. It is preferred to operate with at least a 10% excess of $CO_2$ and $O_2$ simply to maintain turbulence and mixing in the molten salt bath. In practice, preferably not more than a 100% excess of the $CO_2$ and $O_2$ is employed.

According to a second aspect of the invention, the reaction can be carried out at a lower temperature and in liquid sodium carbonate, by employing a mixture of salts that has a lower melting point, such as a mixture of alkali metal or alkaline earth metal halides, e.g. chlorides such as sodium chloride, or by employing a eutectic alkali carbonate mixture, consisting for example of 50% $Na_2CO_3$ and 50% $K_2CO_3$, by weight, melting at 710° C. Use of such mixtures will reduce the temperature in the molten salt bath, e.g. to a range of say 600°–800° C. Also, a lower melting point mixture of two or more salts such as NaCl, KCl or $CaCl_2$, can be employed, alone, or in combination with alkali carbonate, e.g. sodium carbonate.

One can initially start the process employing molten pure alkali carbonate salt or pure chloride salts. Carbonates such as sodium carbonate are formed in the molten bath and increasing the amount thereof in the bath as the process continues, unless a source of chlorine such as chlorine gas or chlorinated hydrocarbons is simultaneously added to the molten salt bath to convert the sodium carbonate to chlorides. The molten salt bath can be 100% alkali metal carbonate, e.g. sodium carbonate, or 100% chlorides, or any mixture thereof, and the molten salt bath temperature will vary depending on the composition thereof.

To maintain a reduced temperature of about 750° C. in the molten salt bath, a mixture of carbonate and chloride approximately corresponding to the eutectic composition of about 50% sodium carbonate and about 50% sodium chloride, by weight, can be employed, and such composition is maintained near the eutectic composition by draining salt as it is produced in the molten salt bath. However, the composition of the molten salt bath can vary from the eutectic sodium carbonate-sodium chloride composition e.g. by about 25%, so long as the desired reduced molten salt bath temperature is maintained. The chloride content can also be maintained constant by controlled addition of chlorine gas or a chlorinated hydrocarbon.

As to the composition of the molten salt bath, when employing alkali metal halides or alkaline earth metal halides in combination with sodium carbonate, it has been found that there is no preference to having calcium chloride mixed with sodium or potassium chloride. Usually, an alkaline earth halide, such as calcium chloride, would not be employed unless one is attempting to dispose of calcium metal, barium metal or magnesium metal. However, if it is desired, for example, to dispose of calcium metal waste, then it is preferable to employ calcium chloride in the molten salt bath. Likewise, if the object is to dispose of sodium or potassium waste, the corresponding chloride would be employed in the molten bath, preferably in combination with alkali carbonates such as sodium carbonate.

As previously noted, temperature of operation of the molten salt bath can range from about 200° to about 900° C., usually from about 600° to about 900° C. If it is desired to operate for example at 600° C., the molten salt composition must have a melting point less than 600° C. If it is desired to operate at 900° C., then various molten salt compositions can be employed because of the high melting point. The operating temperature will dictate which salt composition must be employed in the molten salt bath.

Referring to the drawing, schematically illustrating a system for carrying out a typical process for the disposal of alkali metal waste, such as sodium waste, by oxidation of the sodium to sodium carbonate in molten sodium carbonate, molten sodium waste is fed from an alkali metal feed tank 10 via line 12 through a tube 14 into the molten salt bath, e.g. molten sodium carbonate 16 in a reactor tank 18 positioned in a suitable furnace 19. Carbon dioxide is simultaneously fed from a $CO_2$ supply tank 20 via line 22 into tube 14 and into the molten sodium carbonate bath 16, and oxygen is fed from an oxygen supply tank 24, via line 26 through an inlet tube 28 into the molten salt bath 16. Cooling air is fed at 30 into an annulus 32 in furnace 19 around the molten salt reactor 18, to maintain the desired temperature of the molten salt bath 16, the heated cooling air exiting at 34.

As the oxidation reaction proceeds in the molten salt bath 16 between the sodium feed and the $CO_2$ and $O_2$ introduced into the salt bath to convert the sodium to sodium carbonate, carbonate salt melt is drawn off from the molten salt bed via outlet line 36, for salt disposal at 38. Excess $CO_2$ and $O_2$ is discharged through exit 40 at the top of the reactor 18 and passes via line 42, together with any occluded sodium carbonate, to a filter 44, which separates such sodium carbonate and discharges it via line 46 for disposal at 38. Excess $CO_2$ and $O_2$ from filter 44 is passed via line 48 to a pump 50 for recycling via line 52.

The following are examples of practice of the invention process:

EXAMPLE 1

In one example of molten salt oxidation of sodium waste, on a stoichiometric basis, 46 lbs of sodium is reacted with 44 lb of $CO_2$ and 16 lb of oxygen (or 69 lb of air) to yield 106 lb of $Na_2CO_3$. Heat is released at the rate of 5400 BTU/lb of sodium. The sodium is continuously fed into a reactor, previously filled partially with sodium carbonate, maintained at a temperature of 875° to 1000° C. The carbon dioxide and oxygen (or air) are introduced separately into the reactor vessel. The above amounts of gases are the minimum amount of gas to produce $Na_2CO_3$ product. An excess amount of carbon dioxide and oxygen are added to maintain mixing in the reactor. At least 10% excess gas is needed to maintain turbulent mixing.

The product salt is withdrawn from the reactor on a batchwise basis or continuously. Excess heat is removed by natural cooling of the reactor or by forced convection on the outside of the vessel. The gas leaving the salt bed is filtered in a fabric filter and recycled into the salt reactor. Periodically, the off-gas is released into the atmosphere to remove tramp gas, such as nitrogen or argon. As an option, the gas leaving the reactor is released on a continuous basis, and no gas recycle is used.

EXAMPLE 2

As an example of molten salt oxidation of radioactive sodium waste, the sodium contains radioactive contamination in the form of 1 mCi Cs-137, 1 mCi Co-60, and 1 mCi H-3 (tritium). The radioactive sodium is continuously fed into a reactor, previously filled partially with sodium carbonate, maintained at a temperature of 875° to 1000° C. A small amount of sodium sulfate, less than 5 wt %, is maintained in the reactor vessel to aid in reducing volatility of the radioactive components. Carbon dioxide and oxygen (or air) are introduced separately into the reactor vessel. An excess amount of carbon dioxide and oxygen are added to maintain mixing in the reactor. At least 10% excess gas is needed to maintain turbulent mixing.

The product salt is withdrawn from the reactor on a batchwise basis or continuously. Excess heat is removed by natural cooling of the reactor or by forced convection on the outside of the vessel. The gas leaving the salt bed is filtered in a fabric filter and recycled into the salt reactor. Periodically, the off-gas is released into the atmosphere to remove tramp gas, such as nitrogen or argon. As an option, the gas leaving the reactor is released on a continuous basis, and no gas recycle is used. The radioactive cesium and cobalt are retained in the salt bath. The radioactive hydrogen (tritium) leaves the vessel as tritiated water, HTO, and is collected in a condenser or other typical water vapor adsorption device.

EXAMPLE 3

The following is an example of molten salt oxidation of sodium-potassium (NaK) waste in a salt bed containing about 40% $Na_2CO_3$ and 60% $K_2CO_3$ by weight. On a stoichiometric basis, 33.88 lb of NaK (22 wt % Na-78 wt % K) is reacted with 23.39 lb of $CO_2$ and 8.48 lb of oxygen (or 36.57 lb of air) to yield 25.3 lb of $Na_2CO_3$ and 40.45 lb of $K_2CO_3$. Heat is released due to the oxidation of the NaK.

The carbon dioxide and oxygen (or air) are introduced separately into the reactor vessel. The above amounts of gases are the minimum amount of gas to produce $Na_2CO_3$ and $K_2CO_3$ products. An excess amount of carbon dioxide and oxygen are added to maintain mixing in the reactor. At least 10% excess gas is needed to maintain turbulent mixing. The product salt is withdrawn from the reactor on a batchwise basis or continuously. Excess heat is removed by natural cooling of the reactor or by forced convection on the outside of the vessel. The gas leaving the salt bed is filtered in a fabric filter and recycled into the salt reactor. Periodically, the off-gas is released into the atmosphere to remove tramp gas, such as nitrogen or argon. As an option, the gas leaving the reactor is released on a continuous basis, and no gas recycle is used.

EXAMPLE 4

The following is an example of molten salt oxidation of sodium waste in a salt bed containing carbonates and chlorides. On a stoichiometric basis, 46 lb of sodium is reacted with 44 lb of $CO_2$ and 16 lb of oxygen (or 69 lb of air) to yield 106 lb. of $Na_2CO_3$. Heat is released at the rate of 5400 BTU/lb of sodium.

The sodium waste is continuously fed into a reactor, previously filled partially with sodium carbonate and sodium chloride, maintained at a temperature of 650° to 1000° C. The reactor is filled with a mixture of sodium carbonate and sodium chloride, such that the melting point of the salt is below that of pure sodium carbonate (855° C.) or that of pure sodium chloride (804° C.). This is approximately in the range of 1 mol % $Na_2CO_3$ to 80 mol % $Na_2CO_3$.

The carbon dioxide and oxygen (or air) are introduced separately into the reactor vessel. The above amounts of gases are the minimum amount of gas to produce $Na_2CO_3$ product. An excess amount of carbon dioxide and oxygen are added to maintain mixing in the reactor. At least 10% excess gas is needed to maintain turbulent mixing. The product salt is withdrawn from the reactor on a batchwise basis or continuously. Excess heat is removed by natural cooling of the reactor or by forced convection on the outside of the vessel. The gas leaving the salt bed is filtered in a fabric filter and recycled into the salt reactor. Periodically, the off-gas is released into the atmosphere to remove tramp gas, such as nitrogen or argon. As an option, the gas leaving the reactor is released on a continuous basis, and no gas recycle is used.

From the foregoing, it is seen that the invention provides an improved process for molten salt destruction of alkali metal and alkaline earth metal waste, particularly from reactor coolants, by reaction with a mixture of carbon dioxide and oxygen in a molten carbonate bath. The process control is straightforward with no potential for explosion due to hydrogen gas production of off-normal operation in which water can work its way back from off-gas processes. The waste salt formed in the process is non-hazardous and can be disposed of directly with no further processing. Since no aqueous processing in required, no primary waste from off-gas treatment is generated. The gas system of the invention can operate as a closed system, with a small feed and bleed stream to remove non-condensibles. Vessel off-gas processing includes only filtration of a small fraction of the sodium reaction product generated. The overall cost including construction, operation and eventual decommissioning and decontamination, is lower than other processes because of the high throughput for the compact size of the equipment, low energy usage and no need for an extensive off-gas processing system. The compactness of the molten salt unit with its few operating components results in low maintenance requirements and lower operator exposure to radioactive contaminants. The salt product, e.g. anhydrous sodium carbonate, does not require neutralization under U.S. Environmental Protection Agency regulations.

It is to be understood that what has been described is merely illustrative of the principles of the invention and that numerous arrangements in accordance with this invention may be devised by one skilled in the art without departing from the spirit and scope thereof.

What is claimed is:

1. A process for destroying alkali metal and alkaline earth metal hazardous waste and converting it into non-hazardous salt which comprises feeding said alkali metal or alkaline earth metal containing hazardous waste into a molten salt bath containing a molten salt selected from the group consisting of an alkali metal carbonate, an alkali metal halide, an alkaline earth halide, and mixtures thereof, feeding a mixture of carbon dioxide and oxygen into said molten salt bath, the proportions of carbon dioxide and oxygen being at least sufficient to react stoichiometrically with the alkali metal or alkaline earth metal in said waste, and reacting said alkali metal or said alkaline earth metal with said carbon dioxide and oxygen in said molten salt bath at a temperature above the melting point of the salt in said molten salt bath, and converting said alkali metal or said alkaline earth metal into a non-hazardous carbonate salt in said bath.

2. The process of claim 1, and including adding a member selected from the group consisting of sulfate, phosphate and nitrate to said molten salt to lower the melting point of the salt.

3. The process of claim 1, wherein the temperature of said molten bath ranges from about 200° C. to about 900° C.

4. The process of claim 1, wherein said molten salt bath consists essentially of sodium carbonate and molten salt bath temperature ranges from about 600° C. to about 900° C.

5. The process of claim 3, wherein said waste contains alkali metal, and said alkali metal is sodium, and said sodium is converted to sodium carbonate in said molten salt bath.

6. The process of claim 1, wherein said molten salt bath consists of a mixture of sodium carbonate and a lower melting point salt selected from the group consisting of alkali metal halides, alkaline earth metal halides, and mixtures thereof, and said molten salt bath temperature ranges from about 600° C. to about 800° C.

7. The process of claim 1, wherein the proportions of carbon dioxide and oxygen are at least 10% in excess of the stoichiometric amount required for reaction with the alkali metal or alkaline earth metal in said bath.

8. A process for destroying sodium in hazardous waste and converting it into non-hazardous sodium carbonate which comprises introducing said sodium-containing hazardous waste into a molten sodium carbonate bath, introducing a mixture of carbon dioxide and oxygen into said molten sodium carbonate bath, the proportions of carbon dioxide and oxygen being at least 10% in excess of the stoichiometric amount required for reaction with said sodium in said waste, reacting said sodium in said waste with said carbon dioxide and oxygen in said molten sodium carbonate bath at temperature of between about 800° C. and about 900° C,. and converting said sodium into sodium carbonate in said bath.

9. A process for destroying sodium in hazardous waste and converting it into non-hazardous sodium carbonate which comprises introducing said sodium-containing hazardous waste into a molten salt bath, said salt bath consisting of a mixture of sodium carbonate and a member selected from the group consisting of alkali metal chloride and alkaline earth metal chloride, introducing a mixture of carbon dioxide and oxygen into said molten salt bath, the proportions of carbon dioxide and oxygen being at least 10% in excess of the stoichiometric amount required for reaction with said sodium in said waste, reacting said sodium in said waste with said carbon dioxide and oxygen in said molten salt bath at a temperature between about 600° C. and about 800° C., and converting said sodium into sodium carbonate in said bath.

10. The process of claim 9, wherein said member is a mixture of two or more salts selected from the group consisting of NaCl, and KCl and $CaCl_2$.

11. The process of claim 9, wherein said salt bath consists of a eutectic alkali carbonate mixture consisting of 50% $Na_2CO_3$ and 50% $K_2CO_3$, by weight and a mixture of two or more salts selected from the group consisting of NaCl, KCl and $CaCl_2$.

12. A process for destroying alkali metal and alkaline earth metal hazardous waste and converting it into non-hazardous salt which comprises feeding said alkali metal or alkaline earth metal containing hazardous waste into a molten salt bath containing a molten salt consisting of a mixture of sodium carbonate and a lower melting point salt consisting of a mixture of alkali metal chlorides and alkaline earth metal chlorides, said molten salt bath temperature ranging from about 600° C. to about 800° C., feeding a mixture of carbon dioxide and oxygen into said molten salt bath, the proportions of carbon dioxide and oxygen being at least sufficient to react stoichiometrically with the alkali metal or alkaline earth metal in said waste, and reacting said alkali metal or said alkaline earth metal with said carbon dioxide and oxygen in said molten salt bath at a temperature above the melting point of the salt in said molten salt bath, and converting said alkali metal or said alkaline earth metal into a non-hazardous carbonate salt in said bath.

13. The process of claim 12, wherein said waste contains alkali metal, and said alkali metal is sodium, and said lower melting point salt consists of a mixture of two or more salts selected from the group consisting of NaCl, KCl and $CaCl_2$.

14. A process for destroying alkali metal and alkaline earth metal hazardous waste and converting it into non-hazardous salt which comprises feeding said alkali metal or alkaline earth metal containing hazardous waste into a molten salt bath consisting of a mixture of sodium carbonate and a lower melting point salt selected from the group consisting of alkali metal halides, alkaline earth metal halides, and mixtures thereof, said molten salt bath temperature ranging from about 600° C. to about 800° C., feeding a mixture of carbon dioxide and oxygen into said molten salt bath, the proportions of carbon dioxide and oxygen being at least sufficient to react stoichiometrically with the alkali metal or alkaline earth metal in said waste, and reacting said alkali metal or said alkaline earth metal with said carbon dioxide and oxygen in said molten salt bath at a temperature above the melting point of the salt in said molten salt bath, and converting said alkali metal or said alkaline earth metal into a non-hazardous carbonate salt in said bath, said lower melting point salt being maintained by sparging chlorine or chlorinated hydrocarbon into said molten salt bath to convert carbonate therein to chlorides.

15. The process of claim 1, wherein said molten salt bath consists of a member selected from the group consisting of an alkali metal halide, an alkaline earth halide, and mixtures thereof.

16. The process of claim 1, wherein said molten salt is a eutectic alkali carbonate mixture consisting of 50% $Na_2CO_3$ and 50% $K_2CO_3$, by weight.

17. A process for destroying sodium in sodium-containing hazardous waste and converting it into non-hazardous salt which comprises feeding said sodium containing hazardous waste into a molten salt bath consisting of a mixture of two or more salts selected from the group consisting of NaCl, KCl and $CaCl_2$, feeding a mixture of carbon dioxide and oxygen into said molten salt bath, the proportions of carbon dioxide and oxygen being at least sufficient to react stoichiometrically with the sodium in said waste, and reacting said sodium with said carbon dioxide and oxygen in said molten salt bath at a temperature above the melting point of the salt in said molten salt bath, and converting said sodium into non-hazardous sodium carbonate in said bath.

18. A process for destroying alkali metal and alkaline earth metal hazardous waste and converting it into non-hazardous salt which comprises feeding said alkali metal or alkaline earth metal containing hazardous waste into a molten salt bath containing a molten salt consisting of a eutectic of about 50% $Na_2CO_3$ and about 50% NaCl, by weight, feeding a mixture of carbon dioxide and oxygen into said molten salt bath, the proportions of carbon dioxide and oxygen being at least sufficient to react stoichiometrically with the alkali metal or alkaline earth metal in said waste, and reacting said alkali metal or said alkaline earth metal with said carbon dioxide and oxygen in said molten salt bath at a temperature above the melting point of the salt in said molten salt bath, and converting said alkali metal or said alkaline earth metal into a non-hazardous carbonate salt in said bath.

* * * * *

UNITED STATES PATENT AND TRADEMARK OFFICE
CERTIFICATE OF CORRECTION

PATENT NO. : 5,348,689
DATED : September 20, 1994
INVENTOR(S) : Ricahard L. Gay, Jerold Guon, John C. Newcomb It is certified that error appears in the above-identified patent and that said Letters Patent is hereby corrected as shown below:

ON THE COVER PAGE under "[75] Inventors:" please make the following corrections:

Correct "Ricahard L. Gay" to -- Richard L. Gay --

Signed and Sealed this

Twentieth Day of February, 2001

Attest:

NICHOLAS P. GODICI

*Attesting Officer*  *Acting Director of the United States Patent and Trademark Office*

UNITED STATES PATENT AND TRADEMARK OFFICE
Certificate

Patent No. 5,348,689

Patented: September 20, 1994

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Ricard L. Gay, Chatsworth, CA; Jerold Guon, Woodland Hills, CA; John C. Newcomb, Simi Valley, CA; and George L. Bauerle, Simi Valley, CA.

Signed and Sealed this Second Day of July 2002.

ROY V. KING
*Supervisory Patent Examiner*
Art Unit 1742